US012630703B2

(12) United States Patent
Favero et al.

(10) Patent No.: US 12,630,703 B2
(45) Date of Patent: May 19, 2026

(54) HIGH MOLECULAR WEIGHT ANIONIC POLYACRYLAMIDES

(71) Applicant: SNF GROUP, Andrezieux Boutheon (FR)

(72) Inventors: Cédrick Favero, Andrezieux Boutheon (FR); Johann Kieffer, Andrezieux Boutheon (FR); Nicolas Boisse, Taixing City (CN); Jing Ling, Taixing City (CN)

(73) Assignee: SNF GROUP, Andrezieux Boutheon (FR)

( * ) Notice: Subject to any disclaimer, the term of this patent is extended or adjusted under 35 U.S.C. 154(b) by 181 days.

(21) Appl. No.: 18/481,832

(22) Filed: Oct. 5, 2023

(65) Prior Publication Data

US 2024/0132711 A1      Apr. 25, 2024

(30) Foreign Application Priority Data

Oct. 18, 2022    (CN) ......................... 202211275522.3

(51) Int. Cl.
| | |
|---|---|
| *C08F 220/56* | (2006.01) |
| *C08F 220/52* | (2006.01) |
| *C08L 33/26* | (2006.01) |
| *C09K 8/588* | (2006.01) |
| *C09K 8/62* | (2006.01) |
| *E21B 43/20* | (2006.01) |

(52) U.S. Cl.
CPC ............ *C08L 33/26* (2013.01); *C08F 220/56* (2013.01); *C09K 8/588* (2013.01); *C09K 8/62* (2013.01); *E21B 43/20* (2013.01); *C08L 2205/025* (2013.01)

(58) Field of Classification Search
CPC ...... C08F 220/52; C08F 220/56; C08F 20/52; C08F 20/56; C08F 122/38
See application file for complete search history.

(56) References Cited

U.S. PATENT DOCUMENTS

| | | | |
|---|---|---|---|
| 3,727,689 A | 4/1973 | Clampitt | |
| 3,841,402 A | 10/1974 | Knight et al. | |
| 3,888,312 A | 6/1975 | Tiner et al. | |
| 3,938,594 A | 2/1976 | Rhudy et al. | |
| 4,033,415 A | 7/1977 | Holtmyer et al. | |
| 4,801,389 A | 1/1989 | Brannon et al. | |

| | | | | | |
|---|---|---|---|---|---|
| 5,705,580 | A | * | 1/1998 | Giberti ................. | C08F 220/10 |
| | | | | | 526/201 |
| 6,265,477 | B1 | * | 7/2001 | Hurlock ................... | C08F 2/20 |
| | | | | | 526/201 |
| 8,877,864 | B2 | * | 11/2014 | Carceller ............. | C08F 220/56 |
| | | | | | 524/832 |
| 10,662,149 | B2 | * | 5/2020 | Favero ................. | C07C 303/22 |
| 10,669,231 | B2 | * | 6/2020 | Favero ................. | C07C 309/15 |
| 11,802,109 | B2 | * | 10/2023 | Favero ................. | C07C 303/44 |
| 2023/0272129 | A1 | * | 8/2023 | Favero ................... | C08F 20/58 |
| | | | | | 526/287 |

FOREIGN PATENT DOCUMENTS

| | | | | | | |
|---|---|---|---|---|---|---|
| CN | | 1884321 | A | * | 12/2006 | ........... C08F 220/06 |
| GB | | 951147 | A | | 3/1964 | |
| JP | | 2010270168 | A | * | 12/2010 | |
| JP | | 2010270169 | A | * | 12/2010 | .............. C09K 8/12 |
| JP | | 2010270170 | A | * | 12/2010 | |
| JP | | 2002114808 | B2 | * | 11/2011 | .............. C08F 20/52 |
| WO | WO-2006123993 | A2 | * | 11/2006 | ........... C08F 220/56 |
| WO | | 2008/071808 | | | 6/2008 | |

OTHER PUBLICATIONS

JP 2002114808 B2 (Nov. 2, 2011); machine translation. (Year: 2011).*
CN 1884321 A (Dec. 27, 2006); machine translation. (Year: 2006).*
JP-2010270169-A (Dec. 2, 2010); machine translation. (Year: 2010).*
King et al., SPE 152596, *"Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells—George E. King, Apache Corporation,"* 2012.

* cited by examiner

*Primary Examiner* — Rip A Lee

(74) *Attorney, Agent, or Firm* — HESLIN ROTHENBERG FARLEY & MESITI P.C.

(57) ABSTRACT

This invention relates to a polymer composition comprising a water-soluble anionic P2 polymer obtained by radical polymerization of at least one anionic monomer, in the presence of a water-soluble homopolymer P1 with a weight-average molecular weight of between 5,000 and 100,000 daltons
said water-soluble anionic P2 polymer having a weight-average molecular weight of greater than 100,000 dalton and less than or equal to 40 million daltons,
said water-soluble P1 homopolymer having been prepared from 2-acrylamido-2-methylpropanesulphonic acid in salified form and in the presence of 200 to 20,000 ppm by weight of 2-methyl-2-propenylsulphonic acid in salified form.

18 Claims, No Drawings

HIGH MOLECULAR WEIGHT ANIONIC POLYACRYLAMIDES

CROSS REFERENCE TO RELATED APPLICATIONS

This application is claims priority to Chinese patent application number 2022112755223 filed on Oct. 18, 2022, the entire contents of which are hereby incorporated by reference herein.

FIELD OF THE INVENTION

This invention relates to high molecular weight anionic polyacrylamides. More specifically, these anionic polyacrylamides are obtained by polymerization of anionic monomers in the presence of a homopolymer of 2-acrylamido-2-methylpropane sulfonic in salified form, with an average molecular weight by weight of between 5,000 and 100,000 daltons, said homopolymer being obtained from 2-acrylamido-2-methylpropane sulfonic in salified form containing impurities.

BACKGROUND

High molecular weight anionic polyacrylamides (APAMs) are commonly used in many applications due to, among other things, their flocculent or thickening properties. Indeed, these polymers are used in the following fields: the oil and gas industry, hydraulic fracturing, papermaking processes, sludge dewatering, water treatment, construction, mining, cosmetic formulations, agriculture, textiles, and detergent formulations.

As an example, the flocculating character of these high molecular weight water-soluble synthetic polymers is used in the field of water treatment/sludge dehydration. Indeed, after an optional coagulation step where colloidal particles (assimilated to spheres smaller than 1 micrometer) of a given water are destabilized, flocculation represents the step where particles are gathered into high molecular weight aggregates to generate a rapid sedimentation.

The thickening character of these polymers may be exploited in the field of enhanced oil recovery (EOR).

Most of the oil fields currently in operation have matured and have, in fact, started to decline in production or are about to do so. The recovery rate of these fields is currently around 15 to 35% on average compared to the initial amount of oil. They therefore offer considerable production potential.

In general, the recovery of the crude oil contained in the deposits is carried out in several stages.

Production is primarily the result of the natural energy of the fluids and the rock that decompresses it. At the end of this depletion phase, the quantity of oil recovered on the surface represents on average some 5 to 15% of the initial reserve. It is therefore necessary, in a second step, to employ techniques aimed at increasing the recovery yield by maintaining the pressure of the field.

The method most frequently implemented consists of injecting water into the deposit through injection wells dedicated to this purpose. This is called secondary recovery. This second phase stops when the water/oil ratio is too high, i.e., when the quantity of water in the mixture produced by the producing wells is too high. This secondary recovery thus makes it possible to obtain an additional recovery rate of the order of 10 to 20% compared to the initial amount of oil.

The other techniques that may be used are grouped under the name of Enhanced Oil Recovery (RAP or EOR, the acronym for "Enhanced Oil Recovery"). Their goal is to recover between 10 and 35% additional oil compared to the initial amount of oil. Under the term enhanced oil recovery, various thermal or non-thermal techniques are known, such as the so-called electric, miscible, steam, or even chemical techniques for improved recovery of the oil remaining in place (see "Oil & gas science and technology"—IFP review, vol 63 (2008) n° 1, pp 9-19).

By "petroleum", is meant any type of oil, namely light oil as well as heavy oil, or even bituminous oil. An oil generally results from the natural transformation of organic matter and is composed of a mixture of hydrocarbons. In the description of the prior art or of the invention, the terms, petroleum and oil, are used to designate the same material, with the exception of the mention of the composition of an emulsion or a dispersion.

The effectiveness of water injection sweeping is generally improved by the addition of water-soluble high molecular weight synthetic polymers. The expected and proven benefits of using these polymers, through the "viscosification" of the injected water, are improved sweeping and reduced viscosity contrast between fluids to control their mobility ratio in the field, to recover the oil quickly and efficiently. These polymers increase the viscosity of water.

These high molecular weight anionic polyacrylamides (APAMs), which are most often used in the form of powder resulting from a gel polymerization process, require very long dissolution times for their implementation and require complex and bulky equipment. such as the PSU ("Polymer Slicing Unit", document WO2008071808) and maturation tanks. This is all the more true when these APAM powders must be dissolved in cold and/or salted water. Incomplete dilution induces a need for an overdose of polymer to achieve the required performance (flocculation, thickening effect, etc.).

In addition to increasing the viscosity of water, the polymers used must have good filterability. Polymers with poor filterability tend to clog the underground formation and slow or even inhibit oil production. However, the filterability deteriorates when the molecular weight of the polymer increases. There is therefore a delicate compromise between molecular weight and filterability.

In addition, these polymers, once in solution, are sensitive to radical degradation, which induces a drop in their effectiveness over time.

The production of oil and gas contained in unconventional reservoirs has been developing for several years and requires the opening of fractures in the reservoir for economic production of oil and gas.

By "unconventional reservoirs", we mean deposits requiring specific extraction technologies because they do not exist in the form of an accumulation in a porous and permeable rock (see bedrock hydrocarbons in France Interim Report—CGIET n° 2011-04-G Ministry of ecology, sustainable development, transport and housing—April 2011). For unconventional gas, mention may be made of shale gas, coal bed methane or tight gas. For unconventional oil, mention may be made of heavy oil, shale oil, or tight oil.

The reserves contained in unconventional reservoirs are enormous and extremely extensive in previously unexploitable areas such as bedrock hydrocarbons such as shale, tight gas, and coal gas. In the United States, shale gas is widely exploited and today represents 46% of the total natural gas produced in the United States, whereas it represented only 28% in 1998. The very extensive basins are known as Barnett Shale, Ville Fayette Shale, Mowry Shale, Marcellus Shale, Utica shale. . . The exploitation of compact reservoirs has been made possible by an evolution in drilling techniques.

Production techniques have evolved from vertical wells to horizontal wells, reducing the number of production wells required, their footprint, and enabling better coverage of the reservoir volume for maximum gas recovery. However, the permeabilities are insufficient for the gas to migrate easily from the bedrock to the well, and thus to produce gas or oil economically and in quantity. It is therefore necessary to increase the permeability and the production surfaces by stimulation operations and in particular by hydraulic fracturing of the rock in contact with the well.

Hydraulic fracturing aims to create additional permeability and generate larger gas or oil production areas. Indeed, the low permeability, the natural barriers of compact layers, the waterproofing by the drilling operations strongly limit the production. The gas or oil contained in the unconventional reservoir cannot easily migrate from the rock to the well without stimulation.

These hydraulic fracturing operations on horizontal wells began in 1960 in the Appalachians and today several tens of thousands of operations have taken place in the United States.

Reservoir design, modeling, drilling, cementing, and stimulation technologies have become increasingly sophisticated and use equipment that allows these operations to be carried out in ever shorter times with precise analysis of the results.

These operations consist of injecting water at high pressure and at a very high flow rate so as to create fractures distributed perpendicular to the production wells. One generally proceeds in several stages in order to create fractures along the entire length of the horizontal well, which makes it possible to cover a maximum volume of the reservoir.

In order to keep these fractures open, a proppant (sand, plastic materials or calibrated ceramics) is added so as to prevent these fractures from closing and to maintain the capillarity created once the injection has stopped.

Water alone is not sufficient to achieve good placement efficiency of the proppant due to its low viscosity. This limits its ability to hold the proppant in place within the fractures. To counter this problem, fracturing fluids containing viscosifying compounds have been developed.

By definition, a compound is viscous when it increases the viscosity of solutions in which it is dissolved.

In addition to having viscosifying properties, the compound must have a particular rheological profile. Indeed, the polymer must be able to have a low viscosity in order not to interfere with the transport and pumping of the fluid containing the proppant during the strong shears undergone during the injection of the fracturing fluid. Once injected, this same compound must be able to generate sufficient viscosity when the shear decreases to support the proppant in order to maintain it in the fractures.

The polymer must therefore provide shear-thinning properties to the solution in order to have a relatively low viscosity during injection (at high shear) and a high viscosity in order to maintain the proppant in suspension at the level of the fracture when the shear decreases.

The viscoelastic properties of polymers in solution are also to be considered. This viscoelasticity, and its importance in application, is described in SPE 147206 (Fracturing Fluid Comprised of Components Sourced Solely from the Food Industry Provides Superior Proppant Transport—David Loveless, Jeremy Holtsclaw, Rajesh Saini, Phil Harris, and Jeff Fleming, SPE, Halliburton) through visual observations in static or dynamic experiments, or even by rheology measurements, such as the measurement of the viscous and elastic moduli (G' and G"), or the measurement on a rheometer of the viscosity as a function of shear. Thus, elastic properties will be advantageous in ensuring the transport and suspension of the fracturing proppant.

The choice of polymer is therefore not obvious and requires an in-depth rheological study in order to obtain satisfactory results.

Among the viscosifying compounds of aqueous solutions belonging to the prior art, mention may be made of natural substances such as guar gums and their derivatives such as hydroxypropylguar (HPG), or carboxymethylhydroxypropyl guar (CMHPG); cellulose derivatives such as carboxymethyl cellulose or hydroxyethyl cellulose. These compounds are specifically described in U.S. Pat. Nos. 4,033,415, 3,888, 312 and 4,801,389. In SPE 152596 (Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells—George E. King, Apache Corporation), the latest advances in fracturing fluid performance are discussed in detail.

However, these natural substances, and in particular guar derivatives, are also useful in other applications, such as the food or textile industry, and the development of the exploitation of unconventional oil and gas resources. compete with these other applications. This creates pressure on the availability of these products and causes pricing problems.

Other compounds derived from petrochemicals can have viscosifying properties. Mention may be made of synthetic polymers. Poly(meth)acrylamides, possibly partially hydrolyzed, and poly(meth)acrylates and their copolymers are particularly known. These polymers develop viscosity due to their high molecular weight and inter-chain ionic repulsions. These polymers are described in patents GB951147, U.S. Pat. Nos. 3,727,689, 3,841,402, or even U.S. Pat. No. 3,938,594. The mechanism governing viscosity is related to an increase in hydrodynamic volume through intra-chain repulsions, inter-chain entanglements, etc.

However, in the presence of high salinity or high operating temperature, these polymers do not develop strong entanglements and repulsions, resulting in a strong decrease in their viscosity especially after undergoing the shear of the pumping stage during injection into the underground formation. Furthermore, these polymers generally do not have sufficient viscoelastic properties to support the proppant in the fracturing. The metering of these polymers must be increased to excessive levels to achieve the suspension properties of the proppant. Metering levels are not economically viable.

The polymers used to provide viscosifying properties may advantageously be also friction reducers allowing a reduction in the pressure drop in the turbulent environment and to strongly increase the flow rate with identical power and pipe diameter.

DISCLOSURE OF THE INVENTION

The Applicant has surprisingly discovered that a water-soluble anionic polymer P2 makes it possible to overcome these problems of dissolution and of sensitivity to radical degradation when it is prepared by polymerization of at least one anionic water-soluble monomer and in the presence of a water-soluble P1 homopolymer of 2-acrylamido-2-methylpropane sulfonic acid in salified form with a weight-average molecular weight of between 5,000 and 100,000 daltons. Said water-soluble P1 polymer is prepared from AMPS (2-acrylamido-2-methylpropane sulfonic acid), the AMPS being in salified form and containing impurities.

In fact, the P2 polymer in the composition dissolves quickly, in particular in cold water and in salt water. This is particularly the case when the composition is in the form of a solid composition (e.g., a powder), or a suspension (e.g., an aqueous or oily particulate multiphase suspension). The incorporation of polymer P1 into the polymerization charge of the P2 polymer makes it possible to improve the dissolution of the P2 polymer, which makes it possible to reduce the size of the equipment for its implementation (reduction of maturation times), to make solutions more concentrated in polymer P2 and to allow complete solubilization of the P2 polymer prior to its use. This is accompanied by an improvement in the application performance of the polymer P2 while reducing the dosage of polymer P2. Thus, the carbon footprint linked to the use of the P2 polymer is reduced (rapid dissolution, less energy necessary for its dissolution, more concentrated solution).

Moreover, the polymer composition containing the P2 polymer increases the number of polymeric chains per kg and these chains, once in solution, protect the APAM (anionic polyacrylamide P2) polymer chains of higher mass from radical degradation by sacrificial effect. The performance of the P2 polymer is therefore maintained longer during use.

The anionic water-soluble P2 polymers of the invention have improved properties such as dissolution time, filterability, friction reduction, and improved iron (ferrous and/or ferric ions) stability, particularly useful in enhanced oil or gas recovery techniques.

More specifically, the P1 homopolymer added to the polymerization charge of the anionic P2 polymer is obtained from 2-acrylamido-2-methylpropanesulfonic acid in salified form. This salified form is formed from 2-acrylamido-2-methylpropane sulfonic acid. This anionic monomer is not purified at the end of its manufacturing process: it is generally obtained by Ritter reaction or it comes from a residue or from waste or from a purge from a process for the purification of 2-acrylamido-2-methylpropane sulfonic acid.

The polymerization of this 2-acrylamido-2-methylpropane sulfonic acid in salified form containing impurities is preferably carried out without a transfer agent. The P1 homopolymer (hereinafter called the polymer) therefore generally does not contain phosphorus, since typically the transfer agent is a compound comprising phosphorus such as sodium hypophosphite.

According to the invention, the P1 polymer may have a linear, branched, "star" (i.e., star-shaped), "comb" (i.e., comb-shaped), and/or dendritic shape. Preferably, it has a linear structure.

More specifically, the invention relates to a polymeric composition comprising a water-soluble P2 anionic polymer. The P2 polymer is obtained by radical polymerization of at least one anionic monomer, in the presence of a water-soluble P1 homopolymer with a weight-average molecular weight of between 5,000 and 100,000 daltons, said water-soluble P1 homopolymer having been prepared (prior to P2) from 2-acrylamido-2-methylpropane sulfonic acid in salified form and in the presence of 200 to 20,000 ppm by weight of 2-methyl-2-propenyl-sulfonic acid in salified form (the ppm being expressed relative to the weight of 2-acrylamido-2-methylpropane sulfonic acid in salified form).

The polymeric composition comprising a water-soluble P2 anionic polymer may in particular be in the form of a solution (for example an aqueous solution), of an emulsion (for example a water-in-oil emulsion), of a solid composition (for example a powder), or a suspension (for example an aqueous suspension). The form of the polymeric composition may depend on the polymerization technique used to form the P2 polymer: gel polymerization; precipitation polymerization; emulsion polymerization (aqueous or inverse); suspension polymerization; reactive extrusion polymerization; water-in-water polymerization; and/or micellar polymerization. The preferred polymeric composition is in powder form and is obtained by gel polymerization.

As used herein, the term "water-soluble polymer" refers to a polymer that yields an aqueous solution without insoluble particles when dissolved under agitation for 4 hours at 25° C. and with a concentration of 20 g·L$^{-1}$ in deionized water.

The term "polymer" denotes both homopolymers and copolymers of at least two distinct monomers.

A homopolymer includes only one type of monomer. For example, in the context of this invention, an AMPS homopolymer in salified form does not comprise AMPS in acid form.

An anionic polymer is a polymer whose overall charge is anionic. It contains anionic monomers and may optionally contain nonionic, cationic, zwitterionic monomers.

Value ranges include lower and upper bounds. Thus, the ranges of values "between 0.1 and 1.0" and "from 0.1 to 1" include the values 0.1 and 1.0.

By "A and/or B", means "selected from the group consisting of A, B, and mixtures thereof", that is to say: either A, or B, or A and B.

According to this invention, the weight-average molecular weight of the water-soluble P1 and P2 polymers is determined by measuring the intrinsic viscosity. The intrinsic viscosity may be measured by methods known to the person skilled in the art and may in particular be calculated from the reduced viscosity values for different concentrations by a graphical method consisting of plotting the reduced viscosity values (on the y-axis) as a function of the concentrations (on the x-axis) and extrapolating the curve to a zero concentration. The intrinsic viscosity value is read on the y-axis or using the least squares method. The molecular weight may then be determined by the Mark-Houwink equation:

$$[\eta]=KM^{\alpha} \text{ where:}$$

[η] represents the intrinsic viscosity of the polymer determined by the solution viscosity measurement method, K represents an empirical constant, M represents the molecular weight of the polymer, α represents the Mark-Houwink coefficient, and K and α depend on the particular polymer-solvent system. Tables known to those skilled in the art give the values of a and K according to the polymer-solvent system.

The P1 polymer has a weight-average molecular weight preferably between 5,000 and 100,000 daltons, more preferably between 5,000 and 80,000 daltons and even more preferably between 10,000 and 60,0000 daltons.

The P2 polymer preferably has a weight-average molecular weight greater than 100,000 daltons and less than or equal to 40 million daltons, more preferably between 1 million and 40 million daltons, even more preferably between 1 million and 30 million daltons.

The P1 polymer is advantageously obtained by a radical polymerization process of 2-acrylamido-2-methylpropane sulfonic acid in salified form in aqueous solution known to the person skilled in the art.

The preferential Ritter process which makes it possible to manufacture 2-acrylamido-2-methylpropane sulfonic acid induces the formation of impurities such as 2-methyl-2-propenyl-sulfonic acid and 2-methylidene-1,3 acid-propyl-enedisulfonic. The salified version of 2-acrylamido-2-methylpropane sulfonic acid used for the polymerization of P1, since it is generally derived from the Ritter process without any purification or comes from purging a purification, contains significant amounts of the impurities previously described in salified form.

Preferably, the 2-acrylamido-2-methylpropane sulfonic acid in salified form for the preparation of the homopolymer P1 contains between 300 and 10,000 ppm of 2-methyl-2-propenyl-sulfonic acid in salified form. Thus, the P1 homopolymer is advantageously prepared in the presence of 300 to 10,000 ppm of 2-methyl-2-propenylsulfonic acid in salified form.

Preferably, independently or not, the 2-acrylamido-2-methylpropane sulfonic acid in salified form for the preparation of the P1 homopolymer, contains between 300 and 10,000 ppm by weight of 2-methylidene-1,3-propylenedisulfonic acid in salified form. Thus, the P1 homopolymer is advantageously prepared in the presence of 300 to 10,000 ppm of 2-methyl-2-propenylsulfonic acid in salified form.

The salified form of 2-acrylamido-2-methylpropane sulfonic acid and the previously mentioned impurities (2-methyl-2-propenyl-sulfonic acid in salified form, and 2-methylidene-1,3-propylenedisulfonic acid in salified form) is advantageously the same for these three salts. It is generally an alkali metal salt, selected from sodium, lithium, potassium and/or an alkaline earth salt selected from magnesium, calcium and/or an ammonium salt.

Preferably, the salified forms of 2-acrylamido-2-methylpropane sulfonic and 2-methyl-2-propenyl-sulfonic acids, as well as the salified form of 2-methylidene-1,3-propylenedisulfonic acid, if present, are sodium salts.

The P2 polymer is an anionic polymer obtained by radical polymerization of at least one anionic monomer.

Preferably, the anionic monomer of the P2 polymer is selected from the group consisting of acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid (AMPS), vinylsulfonic acid vinylphosphonic acid, allylsulfonic acid, methallylsulfonic acid, 2-sulfoethylmethacrylate, sulfopropylmethacrylate, sulfopropylacrylate, allylphosphonic acid, styrene sulfonic acid, 2-acrylamido-2-methylpropane disulfonic acid, and the water-soluble salts of these monomers such as their alkali metal, alkaline earth metal, or ammonium salts and mixtures thereof. Preferably, the anionic monomer is acrylic acid in salified form (advantageously sodium acrylate) or 2-acrylamido-2-methylpropane sulfonic acid in salified form (advantageously sodium 2-acrylamido-2-methylpropane sulfonate).

In addition to the anionic monomers, the polymer P2 may contain nonionic monomers selected from the group comprising acrylamide, methacrylamide, N-alkylacrylamides, N-alkylmethacrylamides, N,N-dialkylacrylamides, N,N-dialkylmethacrylamides, alkoxylated esters of acrylic acid, alkoxylated esters of methacrylic acid, N-vinylpyridine, N-vinylpyrrolidone, hydroxyalkylacrylates, hydroxyalkylmethacrylates, N-vinylformamide, and mixtures thereof, the alkyl groups being linear or branched (preferably linear) and $C_1$-$C_3$. Preferably, the nonionic monomer is acrylamide.

In addition to the anionic monomers and the optional non-ionic monomers, monomers having a hydrophobic character may also be used in the preparation of the P2 polymer. They are preferably selected from the groups consisting of esters of (meth)acrylic acid having an alkyl, arylalkyl, propoxylated, ethoxylated, ethoxylated and propoxylated chain; (meth)acrylamide derivatives having a propoxylated, ethoxylated, or ethoxylated and propoxylated alkyl, arylalkyl chain; alkyl aryl sulfonates, and disubstituted amides of (meth)acrylamide having two alkyl, arylalkyl, propoxylated, ethoxylated, or ethoxylated and propoxylated chains; and their mixtures. In this list, alkyl chains (linear or branched) have at least 4 carbon atoms and usually at most 8 carbon atoms, and aryl alkyl or alkyl aryl chains have at least 7 carbon atoms and usually at most 15 carbon atoms.

Advantageously, the P2 polymer is devoid of cationic monomer and/or of zwitterionic monomer.

According to a particular embodiment, the water-soluble P2 polymer can comprise at least one LCST group.

According to the general knowledge of those skilled in the art, an LCST group corresponds to a group whose solubility in water for a determined concentration is modified beyond a certain temperature and as a function of salinity. This is a group with a heating transition temperature that defines its lack of affinity with the solvent medium. The lack of affinity with the solvent results in an opacification or a loss of transparency which may be due to precipitation, aggregation, gelling, or viscosification of the medium. The minimum transition temperature is called "LCST" (an acronym for "Lower Critical Solution Temperature"). A heating transition temperature is observed for each group concentration at LCST. It is greater than the LCST which is the minimum point of the curve. Below this temperature the polymer is soluble in water, above this temperature the polymer loses its water solubility.

According to a particular embodiment, the water-soluble P2 polymer may comprise at least one UCST group.

According to the general knowledge of one skilled in the art, a UCST group corresponds to a group whose solubility in water for a given concentration is modified below a certain temperature and as a function of salinity. This is a group with a cooling transition temperature that defines its lack of affinity with the solvent medium. Lack of solvent affinity results in opacification or loss of transparency which may be due to precipitation, aggregation, gelation, or viscosification of the medium. The maximum transition temperature is called "UCST" (an acronym for "Upper Critical Solution Temperature"). For each group concentration at UCST, a cooling transition temperature is observed. It is lower than the UCST which is the maximum point of the curve. Above this temperature, the polymer is soluble in water, below this temperature, the polymer loses its solubility in water.

According to the invention, the P2 polymer, may have a linear, branched, "star" (i.e., star-shaped), "comb" (i.e., comb-shaped), and/or dendritic structure. These structures may be obtained by selection of the choice of the initiator, of the transfer agent if it is present (not the preferred case), of the technique of radical polymerization such as the controlled radical polymerization known as RAFT (reversible addition fragmentation chain transfer), NMP (Nitroxide Mediated Polymerization) or ATRP (Atom Transfert Radical Polymerization), the incorporation of structural monomers, and their concentration.

According to the invention, the P2 polymer is advantageously linear or structured. "Structured polymer", denotes a nonlinear polymer which has side chains so as to obtain a strong state of entanglement leading to very high low-gradient viscosities, when this polymer is dissolved in water. However, the structured polymer according to the invention remains water-soluble.

The water-soluble polymer P2 may also be structured:

by at least one structural agent, which may advantageously be selected from the group comprising polyethylenically unsaturated monomers (i.e., having at least two unsaturated functions), such as, for example, vinyl, allyl, acrylic, and epoxy functions; mention may be made, for example, of methylene bis acrylamide (MBA), triallylamine, tetraallylammonium chloride, or 1,2-dihydroxyethylene bis-(N-acrylamide), and/or by macro-initiators such as polyperoxides, polyazos, and polytransfer agents such as polymercaptans, and polyols, and/or by functionalized polysaccharides.

The amount of branching/crosslinking agent in the monomer mixture is advantageously less than 4% by weight, more preferably less than 1%, and even more advantageously less than 0.5% relative to the total monomer content. According to a particular embodiment, it may be at least equal to 0.00001% by weight relative to the total monomer content.

In general, the P2 water-soluble polymer does not require the development of a particular polymerization process. Indeed, it may be obtained according to all the polymerization techniques well known to those skilled in the art. It may in particular be a question of polymerization in solution; gel polymerization; precipitation polymerization; emulsion polymerization (aqueous or reverse); suspension polymerization; reactive extrusion polymerization; water-in-water polymerization; or micellar polymerization.

Advantageously, the P2 polymer is obtained by a gel or inverse emulsion polymerization process, which are known to those skilled in the art.

The polymer P1 is added before the start of the polymerization of the monomers, advantageously at the same time as the anionic monomers and any other monomers, generally before the addition of any initiator (azo compound, peroxide and/or redox systems).

In one preferred embodiment, the polymer P2 is polymerized from 5 to 100% in moles of anionic monomers and from 0 to 95% in moles of nonionic monomers, preferably from 10 to 50% in moles of anionic monomers and from 50 to 90% in moles of nonionic monomers. Advantageously, the polymer P2 consists of 5 to 100% in moles of anionic monomers and from 0 to 95% in moles of nonionic monomers. If applicable. in the presence of other monomers (monomers of hydrophobic, cationic, zwitterionic, LCST, or UCST nature), the total of the monomers constitutes 100% in moles of monomers.

Advantageously, the polymeric composition contains between 0.01 and 5.0% by weight of polymer P1, more preferably between 0.05 and 3% by weight, even more preferably between 0.1 and 2% by weight, relative to the dry weight of the polymeric composition.

Another aspect of the invention relates to the use of the polymeric composition comprising the anionic P2 polymer in the recovery of hydrocarbons (petroleum and/or gas); in the drilling and cementing of wells; in the stimulation of hydrocarbon wells (petroleum and/or gas), e.g. hydraulic fracturing, conformance, diversion; in the treatment of water, for example in an open, closed or semi-closed circuit; in the treatment of fermentation musts; in sludge treatment;

in the manufacture of paper; in the construction; in the treatment of wood; in the treatment of hydraulic composition (concrete, cement, mortar and aggregates); in the mining industry; in the formulation of cosmetic products; in the formulation of detergents; in the manufacture of textiles; in the manufacture of battery components; in geothermal energy; in the manufacture of sanitary pads; or in agriculture.

The polymeric composition according to the invention is preferably used as a flocculant, coagulant, binding agent, fixing agent, viscosity-reducing agent, thickening agent, absorbing agent, friction-reducing agent, draining agent, drainage agent, filler retention agent, dehydrating agent, conditioning agent, stabilizing agent, fixing agent, film-forming agent, sizing agent, superplasticizer, clay inhibitor, or dispersant.

The invention also relates to a process for the enhanced recovery of hydrocarbons (oil and/or gas) by sweeping a subterranean formation comprising the following steps:

a. Prepare an injection fluid from a polymeric composition according to the invention, with water or brine, b. Inject the injection fluid into a subterranean formation, c. Sweep the subterranean formation using the injected fluid, d. Recover an aqueous mixture of hydrocarbons (oil and/or gas).

According to the invention, the injection fluid advantageously comprises between 10 ppm and 15,000 ppm of water-soluble polymer P2, more advantageously between 50 and 10,000 ppm, and even more advantageously between 100 and 5,000 ppm, relative to the weight of the fluid injection.

The term "filtration quotient" is used in this document to designate a test used to determine the performance of the polymeric composition according to the invention under conditions of low permeability of the underground formation (or underground reservoir). This test consists of measuring the time taken by given volumes/concentrations of solution (injection fluid) to pass through a filter. The FR generally compares the filterability of the solution for two consecutive equivalent volumes, which indicates the tendency of the solution to clog the filter. Lower FRs indicate better performance.

The test used to determine the FR consists of measuring the times taken by given volumes of solution containing 1000 active ppm of polymer (in the polymer composition containing P2) to flow through a filter. The solution is contained in a pressurized cell at two bars of pressure and the filter is 47 mm in diameter and of a defined pore size. Generally the FR is measured with filters having a pore size of 1.2 μm, 3 μm, 5 μm, or 10 μm.

The times needed to obtain 100 ml ($t_{100\ ml}$); 200 ml ($t_{200\ ml}$) and 300 ml ($t_{300\ ml}$) of filtrate are therefore measured and a FR is then defined, expressed by:

$$FR = \frac{t_{300\,ml} - t_{200\,ml}}{t_{200\,ml} - t_{100\,ml}}$$

Times are measured to the nearest 0.1 second.

The FR thus represents the capacity of the polymer solution to clog the filter for two equivalent consecutive volumes.

A final aspect of the invention relates to a process for the hydraulic fracturing of an underground reservoir of hydrocarbons (petroleum and/or gas) comprising the following steps:

a. Prepare an injection fluid from a polymeric composition according to the invention, with water or brine, and with at least one proppant, b. Inject said fluid into the underground reservoir and fracturing at least a part thereof in order to recover hydrocarbons (petroleum and/or some gas).

The proppant may be selected without restriction from sand, ceramic, bauxite, glass beads, sand impregnated with resin. It advantageously represents from 0.5 to 40%, preferably from 1 to 25% and even more preferably from 1.5 to 20% by weight of the injection fluid.

The injection fluid may include other compounds known to those skilled in the art (as summarized in document EPS 152596):

anti-swelling agents for clays such as potassium chloride or choline chloride, biocides to avoid the development of bacteria, in particular sulfate-reducing bacteria, which can form viscous masses reducing the passage surfaces. Glutaraldehyde is the most widely used, along with formaldehyde or isothiazolinones, oxygen reducers such as ammonium bisulfite to prevent the destruction of other components by oxidation and corrosion of the injection tubes, anti-corrosion additives to protect the tubes against oxidation by residual amounts of oxygen, for example N,N dimethylformamide, lubricants such as petroleum distillates, chelating agents for iron such as acid citric acid, EDTA, phosphonates, antiscalant products such as phosphates, phosphonates, polyacrylates or ethylene glycol.

According to another embodiment, the water-soluble P2 polymer of the fracturing fluid is, before its introduction into the fracturing fluid, in the form of an aqueous particulate multiphase suspension comprising:

(i) 15 to 60% by weight of at least polymer P2 in the form of solid particles of average size between 5 and 500 m;

(ii) 15 to 45% by weight of at least one alkali metal salt and/or at least one salt of an alkaline earth metal;

(iii) at least one viscosifying agent different from the water-soluble polymer;

(iv) at least 10% by weight of water; and said suspension having a Brookfield viscosity of between 500 and 20,000 cps at a temperature of 25° C., and a density of between 1.1 and 2 kg·L$^{-1}$.

According to another embodiment, the P2 water-soluble polymer is, prior to its introduction into the fracturing fluid, in the form of an oily particulate multiphase suspension comprising:

(v) 15 to 60% by weight of at least one P2 polymer in the form of solid particles with an average size of between 5 and 500 μm;

(vi) 15 to 45% by weight of at least one alkali metal salt and/or at least one salt of an alkaline earth metal;

(vii) at least one viscosifying agent other than the water-soluble polymer;

(viii) at least 10% by weight of oil; and and said suspension having a Brookfield viscosity of from 500 to 20,000 cps at a temperature of 25° C., and a density of from 0.6 to 1.4 kg·L$^{-1}$.

The Brookfield viscosity is measured with a Brookfield viscometer equipped with an LV module. This module is able to rotate at a speed of 30 rpm e.g., and the measurement is advantageously carried out at 20° C.

In this invention, average size denotes the average diameter of the particles. The analysis of the size of the particles is carried out according to conventional techniques known to those skilled in the art. An example of a device for measuring mean particle diameter is the Mastersizer from Malvern Instruments.

The density is measured at 25° C., at a pressure of 1 atmosphere, i.e., 101,325 Pa.

Preferably, when the water-soluble polymer P2 is within the fracturing field and has a concentration of between 0.005 and 5 pptg ("pounds per thousand gallons"; one pound represents 0.45359237 kg and one gallon 3.78541 liters) in the injection fluid (fracturing fluid). Even more preferably, its concentration is between 0.1 and 3 pptg.

The following examples illustrate the invention without limiting its scope.

EMBODIMENTS OF THE INVENTION

Example 1: Synthesis of Polymers P1a, P1b, and P1c

In a 1 liter jacketed reactor, equipped with a condenser and a stirrer, 190 g of deionized water are added to be heated to 80° C. under a nitrogen atmosphere (nitrogen flow).

A sodium persulfate solution is prepared in a dropping funnel, by dissolving 17 g of sodium persulfate in 100 g of deionized water. 690 g of a sodium salt solution of 2-acrylamido-2-methylpropane sulfonic acid (Na-AMPS) at 50% concentration by weight in water are charged into a second dropping funnel. A high pressure liquid chromatography analysis indicates a quantity of 1556 ppm (by weight/Na-AMPS) of 2-methyl-2-propenyl-sulfonic acid in the form of the sodium salt and 450 ppm (by weight/Na-AMPS) 2-methylidene-1,3-propylenedisulfonic acid in the form of a sodium salt.

The sodium persulfate solution is added to the reactor over a period of 120 minutes, and concomitantly the sodium salt solution of 2-acrylamido-2-methylpropanesulfonic acid is added over a period of 90 minutes. During the addition of these reagents and then again for 60 minutes (counted after addition of the sodium persulfate), the reaction medium is maintained at 80° C. The P1a polymer according to the invention thus obtained has a weight-average molecular weight equal to 47,000 daltons (determined from the intrinsic viscosity).

The synthesis of a P1b polymer is undertaken by carrying out the same protocol as previously (P1a polymer) with the only difference that the polymerization temperature is maintained at 100° C. The P1b polymer according to the invention thus obtained has a weight-average molecular weight equal to 24,600 daltons (determined from the intrinsic viscosity).

The synthesis of a P1c polymer is undertaken by carrying out the same protocol as previously (P1a polymer) with the only difference that 2-methylpropane sulfonic acid in salified form (Na-AMPS) contains an amount of 102 ppm of acid 2-methyl-2-propenyl-sulfonic acid as the sodium salt and 80 ppm of 2-methylidene-1,3-propylenedisulfonic acid as the sodium salt. The P1c polymer according to the invention thus obtained has a weight-average molecular weight equal to 245,000 daltons (determined from the intrinsic viscosity).

All the P1 polymers previously described are in the form of an aqueous solution with a concentration of 40% by weight of a 2-methylpropanesulfonic acid homopolymer in the form of the sodium salt in water.

13

Examples 2: Synthesis of Polymeric Compositions
Comprising the P2a and P2b Polymers According
to the Invention and the Comparative P2c Polymer
(P2 Polymers: Acrylamide/Acrylate Sodium
Polymers)

In a 1000 mL beaker, 389 g of deionized water, 102 g of acrylic acid (90% concentration by weight in water), 396 g of acrylamide (50% concentration by weight in water) and 16 g of polymer P1a (40% concentration by weight in water).

The solution thus obtained is cooled to between 5 and 10° C., and is neutralized with 113 g of sodium hydroxide solution (NaOH) at 50% concentration by weight in water while maintaining a temperature below 10° C. The solution is then transferred to an adiabatic polymerization reactor. Nitrogen bubbling is then carried out for 30 minutes in order to eliminate all traces of dissolved oxygen.

The following are then added to the reactor:
0.45 g of 2,2'-azobisisobutyronitrile,
1.5 mL of an aqueous solution at 2.5 g/L of 2,2'-Azobis [2-(2-imidazolin-2-yl)propane]dihydrochloride,
1.5 mL of an aqueous solution of 1 g/L of sodium hypophosphite,
1.5 mL of an aqueous solution of 1 g/L of tert-butyl hydroperoxide,
1.5 mL of an aqueous solution of 1 g/L of ammonium sulfate and iron (II) hexahydrate (Mohr's salt).

After a few minutes, the nitrogen bubbling is stopped. The exothermic polymerization reaction takes place for 4 hours to reach a temperature peak. At the end of this period, the polymer gel obtained is chopped then dried and then ground again to obtain a P2a polymer according to the invention in the form of a powder with an average molecular weight by weight equal to 24,230,600 daltons (determined from the intrinsic viscosity).

A P2b polymer is obtained by applying the same protocol but in the absence of polymer P1. The P2b polymer according to the invention thus obtained has a weight-average molecular weight equal to 24,320,500 daltons (determined from the intrinsic viscosity).

A P2c polymer is obtained by applying the same protocol with, instead of the P1a polymer: the P1c polymer. The P2c polymer according to the invention thus obtained has a weight-average molecular weight equal to 24,400,500 daltons (determined from the intrinsic viscosity).

Examples 3: Synthesis of Polymeric Compositions
Comprising the P2d and P2e Polymers According
to the Invention and the Comparative Polymers P2f
and P22 (P2 Polymers: sodium
2-acrylamido-2-methylpropane sulfonate
homopolymers)

In a 1000 mL beaker, 584 g of deionized water and 300 g of sodium 2-acrylamido-2-methylpropane sulfonate (50% concentration by weight in water) and 14 g of polymer P1a (40% concentration by weight in water) are added.

The solution thus obtained is cooled to between 5 and 10° C., and is neutralized with 116 g of sodium hydroxide solution (NaOH) at 50% concentration by weight in water while maintaining a temperature below 10° C. The solution is then transferred to an adiabatic polymerization reactor. Nitrogen bubbling is then carried out for 30 minutes in order to eliminate all traces of dissolved oxygen.

The following are then added to the reactor:
0.45 g of 2,2'-azobisisobutyronitrile,
1.5 mL of an aqueous solution at 2.5 g/L of 2,2'-Azobis [2-(2-imidazolin-2-yl)propane]dihydrochloride,
1.5 mL of an aqueous solution of 1 g/L of sodium hypophosphite,
1.5 mL of an aqueous solution of 1 g/L of tert-butyl hydroperoxide,
1.5 mL of an aqueous solution of 1 g/L of ammonium sulfate and iron (II) hexahydrate (Mohr's salt).

After a few minutes, the nitrogen bubbling is stopped. The exothermic polymerization reaction takes place for 4 hours to reach a temperature peak. At the end of this period, the polymer gel obtained is chopped then dried and then ground again to obtain a P2d polymer according to the invention in the form of a powder with a weight average molecular weight equal to 8,630,200 daltons (determined from the intrinsic viscosity).

A P2e polymer is obtained by applying the same protocol with, instead of the P1a polymer: the P1b polymer. The P2e polymer thus obtained in powder form has a weight average molecular weight of 8,400,000 daltons (determined from the intrinsic viscosity).

A P3f polymer is obtained by applying the same protocol with, instead of the P1a polymer: the P1c polymer. The P2f thus obtained in powder form has a weight average molecular weight equal to 8,500,000 daltons (determined from the intrinsic viscosity).

A P2g polymer is obtained by applying the same protocol but in the absence of polymer P1. The comparative P2g polymer according to the invention thus obtained in powder form has a weight average molecular weight equal to 8,230,100 daltons (determined from the intrinsic viscosity).

A P2g polymer is obtained by applying the same protocol but with the addition of 60 g of polymer P1b. The P2g polymer according to the invention thus obtained in powder form has a weight average molecular weight equal to 4,890,250 daltons (determined from the intrinsic viscosity).

Examples 4: Synthesis of Polymeric Compositions
Comprising the Polymers P2h According to the
Invention and the Comparative Polymers P2i and
P2j (Polymers P2: ter-polymers acrylamide/acrylate
of sodium/2-acrylamido-2-methylpropane sodium
sulfonate)

In a 1000 mL beaker, are added 461 g of deionized water, and 105 g of sodium 2-acrylamido-2-methylpropane sulfonate acid (50% concentration by weight in water), 30 g of acrylic acid (90% concentration by weight in water) and 10 g of polymer P1b (40% concentration by weight in water).

The solution thus obtained is cooled to between 5 and 10° C., and is neutralized with 74 g of sodium hydroxide solution (NaOH) at 50% concentration by weight in water while maintaining a temperature below 10° C. The solution is then transferred to an adiabatic polymerization reactor. Nitrogen bubbling is then carried out for 30 minutes in order to eliminate all traces of dissolved oxygen.

The following are then added to the reactor:
0.45 g of 2,2'-azobisisobutyronitrile,
1.5 mL of an aqueous solution at 2.5 g/L of 2,2'-Azobis [2-(2-imidazolin-2-yl)propane]dihydrochloride,
1.5 mL of an aqueous solution of 1 g/L of sodium hypophosphite,
1.5 mL of an aqueous solution of 1 g/L of tert-butyl hydroperoxide, 1.5 mL of an aqueous solution of 1 g/L of ammonium sulfate and iron (II) hexahydrate (Mohr's salt).

After a few minutes, the nitrogen bubbling is stopped. The exothermic polymerization reaction takes place for 4 hours to reach a temperature peak. At the end of this period, the polymer gel obtained is chopped then dried and then ground again to obtain a P2h polymer according to the invention in the form of a powder with a weight average molecular weight equal to 14,630,600 daltons (determined from the intrinsic viscosity).

A P2i polymer is obtained by applying the same protocol but in the absence of polymer P1. The P2i polymer according to the invention thus obtained in powder form has a weight average molecular weight equal to 14,780,500 daltons (determined from the intrinsic viscosity).

A P2j polymer is obtained by applying the same protocol with, instead of the P1a polymer: the P1c polymer. The P2j polymer thus obtained in powder form has a weight average molecular weight of 14,000,800 daltons (determined from the intrinsic viscosity).

Examples 5: Comparison of the Dissolution Rates of the P2 Polymers

P2 polymer solutions are prepared at an active concentration of 1000 ppm in deionized water or in a brine containing water, 30,000 ppm NaCl, and 3000 ppm $CaCl_2$, $2H_2O$. The aqueous solutions are stirred and the powder is introduced slowly into the vortex formed by the magnetic bar. The complete dissolution time of the polymer in aqueous solution corresponds to the time from which the maximum viscosity of the polymer solution is reached.

TABLE 1

| Polymer | Dissolution time in deionized water (minutes) | Dissolution time in brine (minutes) |
|---|---|---|
| P2a (invention) | 100 | 150 |
| P2b (comparative) | 125 | 195 |
| P2c (comparative) | 122 | 190 |
| P2d (invention) | 53 | 80 |
| P2e (invention) | 51 | 74 |
| P2f (comparative) | 67 | 100 |
| P2g (comparative) | 69 | 105 |
| P2h (invention) | 81 | 118 |
| P2i (comparative) | 92 | 141 |
| P2j (comparative) | 91 | 139 |

Examples 6: Measurement of the Resistance to the Chemical Degradation of P2 Polymer Solutions Chemical degradation resistance tests are carried out under aerobic conditions in the presence of different concentrations of iron (II) (2, 10, and 20 ppm) in a brine composed of water, 37,000 ppm NaCl, 5,000 ppm $Na_2SO_4$ and 200 ppm of $NaHCO_3$ (the ppm are expressed by weight relative to the weight of the brine). The results obtained after 24 hours of bringing the P2 polymer solution into contact with the contaminant (iron II) are presented in Table 2.

TABLE 2

| Polymer | Loss of viscosity with 2 ppm of iron II, in % | Loss of viscosity with 10 ppm of iron II, in % | Loss of viscosity with 20 ppm of iron II, in % |
|---|---|---|---|
| P2a (invention) | 4 | 11 | 28 |
| P2b (comparative) | 7 | 18 | 35 |

TABLE 2-continued

| Polymer | Loss of viscosity with 2 ppm of iron II, in % | Loss of viscosity with 10 ppm of iron II, in % | Loss of viscosity with 20 ppm of iron II, in % |
|---|---|---|---|
| P2c (comparative) | 6 | 18 | 34 |
| P2d (invention) | 5 | 12 | 29 |
| P2e (invention) | 5 | 11 | 27 |
| P2f (comparative) | 8 | 19 | 36 |
| P2g (comparative) | 9 | 18 | 36 |
| P2h (invention) | 4 | 13 | 29 |
| P2i (comparative) | 8 | 19 | 35 |
| P2j (comparative) | 7 | 19 | 34 |

Examples 7: Measurement of the Filtration Quotient of P2 Polymer Solutions

The P2 polymer solutions were prepared at an active concentration of 1,000 ppm in a brine containing water, 30,000 ppm of NaCl and 3,000 ppm of $CaCl_2$, $2H_2O$ (the ppm are expressed by weight relative to the weight of the brine). The filtration quotient (FR) was measured on filters having a pore size of 3 μm representative of low permeability deposits. The results are shown in Table 3.

TABLE 3

| Polymer | Molecular weight (in daltons) | Filtration Quotient (FR) |
|---|---|---|
| P2a (invention) | 24,230 600 | 1.1 |
| P2b (comparative) | 24,320 500 | 1.17 |
| P2c (comparative) | 24,400 500 | 1.22 |
| P2d (invention) | 8,630 200 | 1.09 |
| P2e (invention) | 8,400 000 | 1.05 |
| P2f (comparative) | 8,500,000 | 1.19 |
| P2g (comparative) | 8,230,100 | 1.21 |
| P2h (invention) | 14,630,600 | 1.09 |
| P2i (comparative) | 14,780 500 | 1.23 |
| P2j (comparative) | 14,000,800 | 1.22 |

Example 8: Flow Loop Friction Reduction Test

The P2 polymers are dissolved with stirring at a concentration of 10,000 ppm in a brine composed of water, 85 g of sodium chloride (NaCl), and 33.1 g of calcium chloride $CaCl_2$), $2H_2O$ per liter of brine. The polymer saline solutions thus obtained are then injected at a concentration of 0.05 pptg into the brine recirculated for the Flow Loop tests. The Flow Loop consists of a recirculation loop with an internal diameter of 1.27 cm, a pump and multiple pressure sensors installed along the recirculation loop. The Flow Loop is thus previously filled with 20 liters of brine, and is recirculated at a rate of 24 gallons per minute. The percentage of friction reduction is thus determined thanks to the measurement of pressure variations measured inside the Flow Loop. The performance of polymers is measured according to the maximum friction reduction obtained, and the time required to obtain this maximum.

A product is all the more efficient when the maximum friction reduction is high, and the time required to obtain it is short.

17

TABLE 4

| Polymer | Maximum friction reduction (%) | Time to reach maximum friction reduction (seconds) |
|---|---|---|
| P2a (invention) | 51 | 13 |
| P2b (comparative) | 43 | 12 |
| P2c (comparative) | 40 | 16 |
| P2d (invention) | 46 | 13 |
| P2e (invention) | 38 | 12 |
| P2f (comparative) | 39 | 16 |
| P2g (comparative) | 38 | 17 |
| P2h (invention) | 31 | 14 |
| P2i (comparative) | 24 | 22 |
| P2j (comparative) | 25 | 20 |

The invention claimed is:

1. A polymeric composition comprising a water-soluble anionic P2 polymer obtained by radical polymerization of at least one anionic monomer, in the presence of a water-soluble P1 homopolymer with an average molecular weight by weight of between 5,000 and 100,000 daltons, wherein said water-soluble anionic P2 polymer has a weight-average molecular weight greater than 100,000 daltons and less than or equal to 40 million daltons, and said water-soluble P1 homopolymer is prepared from 2-acrylamido-2-methylpropane sulfonic acid in salified form and in the presence of 200 to 20,000 ppm by weight of 2-methyl-2-propenyl-sulfonic acid in salified form.

2. The polymeric composition according to claim 1, wherein the water-soluble P1 homopolymer is prepared in the presence of 300 to 10,000 ppm of 2-methyl-2-propenyl-sulfonic acid in salified form.

3. The polymeric composition according to claim 1, wherein the water-soluble P1 homopolymer is prepared in the presence of 300 to 10,000 ppm by weight of 2-methyl-idene-1,3-propylenedisulfonic acid in salified form.

4. The polymeric composition according to claim 1, wherein the salified form of 2-acrylamido-2-methylpropane sulfonic acid and of 2-methyl-2-propenyl-sulfonic acid, as well as a salified form of 2-methylidene-1,3-propylenedis-ulfonic acid if present, is a sodium salt.

5. The polymeric composition according to claim 1, wherein the water-soluble anionic P2 polymer has a weight average molecular weight between 1 million and 40 million daltons.

6. The polymeric composition according to claim 5, wherein the at least one anionic monomer of the water-soluble anionic P2 polymer is selected from the group consisting of acrylic acid, methacrylic acid itaconic acid, crotonic acid, maleic acid, fumaric acid, acrylamido unde-canoic acid, 3-acrylamido 3-methylbutanoic acid, maleic anhydride, 2-acrylamido-2-methylpropane sulfonic acid (ATBS), vinylsulfonic acid, vinylphosphonic acid, ally-lsulfonic acid, methallylsulfonic acid, 2-sulfoethylmeth-acrylate, sulfopropylmethacrylate, sulfopropylacrylate, ally-lphosphonic acid, styrene sulfonic acid, 2-acrylamido-2-methylpropane disulfonic acid, water-soluble salts of these monomers, and mixtures thereof.

7. The polymer composition according to claim 6, wherein:

the polymer composition contains between 0.01 and 5.0% by weight of water-soluble P1 homopolymer; and
the water-soluble anionic P2 polymer contains between 10 and 100% in moles of anionic monomers and between 0 and 90% in moles of nonionic monomers.

8. The polymeric composition according to claim 1, wherein the at least one anionic monomer of the water-soluble anionic P2 polymer is selected from the group consisting of acrylic acid, methacrylic acid itaconic acid, crotonic acid, maleic acid, fumaric acid, acrylamido unde-canoic acid, 3-acrylamido 3-methylbutanoic acid, maleic anhydride, 2-acrylamido-2-methylpropane sulfonic acid (ATBS), vinylsulfonic acid, vinylphosphonic acid, ally-lsulfonic acid, methallylsulfonic acid, 2-sulfoethylmeth-acrylate, sulfopropylmethacrylate, sulfopropylacrylate, ally-lphosphonic acid, styrene sulfonic acid, 2-acrylamido-2-methylpropane disulfonic acid, water-soluble salts of these monomers, and mixtures thereof.

9. The polymer composition according to claim 1, wherein the water-soluble anionic P2 polymer contains between 10 and 100% in moles of anionic monomers and between 0 and 90% in moles of nonionic monomers.

10. The polymer composition according to claim 1, con-taining between 0.01 and 5.0% by weight of water-soluble P1 homopolymer.

11. The polymeric composition according to claim 2, wherein the water-soluble P1 homopolymer is prepared in the presence of 300 to 10,000 ppm by weight of 2-methyl-idene-1,3-propylenedisulfonic acid in salified form.

12. The polymeric composition according to claim 11, wherein the salified form of 2-acrylamido-2-methylpropane sulfonic acid and of 2-methyl-2-propenyl-sulfonic acid, as well as the salified form of 2-methylidene-1,3-propylene-disulfonic acid if present, is a sodium salt.

13. The polymeric composition according to claim 12, wherein the water-soluble anionic P2 polymer has a weight average molecular weight between 1 million and 40 million daltons.

14. The polymeric composition according to claim 13, wherein the at least one anionic monomer of the water-soluble anionic P2 polymer is selected from the group consisting of acrylic acid, methacrylic acid itaconic acid, crotonic acid, maleic acid, fumaric acid, acrylamido unde-canoic acid, 3-acrylamido 3-methylbutanoic acid, maleic anhydride, 2-acrylamido-2-methylpropane sulfonic acid (ATBS), vinylsulfonic acid, vinylphosphonic acid, ally-lsulfonic acid, methallylsulfonic acid, 2-sulfoethylmeth-acrylate, sulfopropylmethacrylate, sulfopropylacrylate, ally-lphosphonic acid, styrene sulfonic acid, 2-acrylamido-2-methylpropane disulfonic acid, water-soluble salts of these monomers, and mixtures thereof.

15. The polymer composition according to claim 14, wherein the water-soluble anionic P2 polymer contains between 10 and 100% in moles of anionic monomers and between 0 and 90% in moles of nonionic monomers.

16. The polymer composition according to claim 15, containing between 0.01 and 5.0% by weight of water-soluble P1 homopolymer.

17. A method for enhanced recovery of oil and/or gas by sweeping a subterranean formation, comprising the follow-ing steps:

a. preparing an injection fluid from a polymeric compo-sition according to claim 1, with water or brine,
b. injecting the injection fluid into a subterranean forma-tion,
c. sweeping the subterranean formation using the injected fluid, and
d. recovering an aqueous mixture of petroleum and/or gas.

18. A method for hydraulic fracturing of a subterranean oil and/or gas reservoir, comprising the following steps:

a. preparing an injection fluid from a polymeric compo-sition according to claim 1, with water or brine, and with at least one proppant, and b. injecting said fluid into the subterranean reservoir and fracturing at least a portion thereof in order to recover oil and/or gas.

\* \* \* \* \*